able-less, tire is mounted on the wheel rim 26 by forcing the

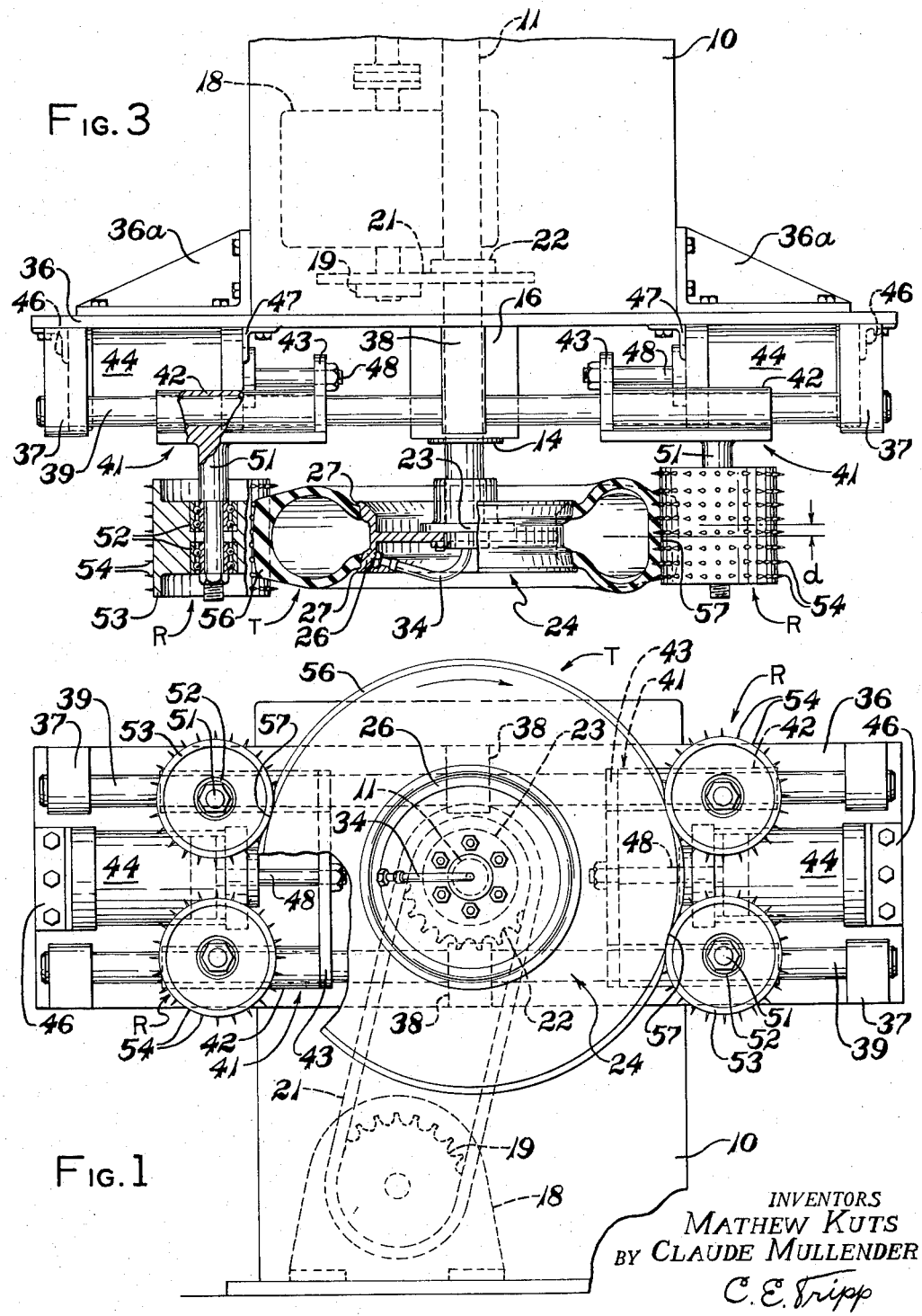

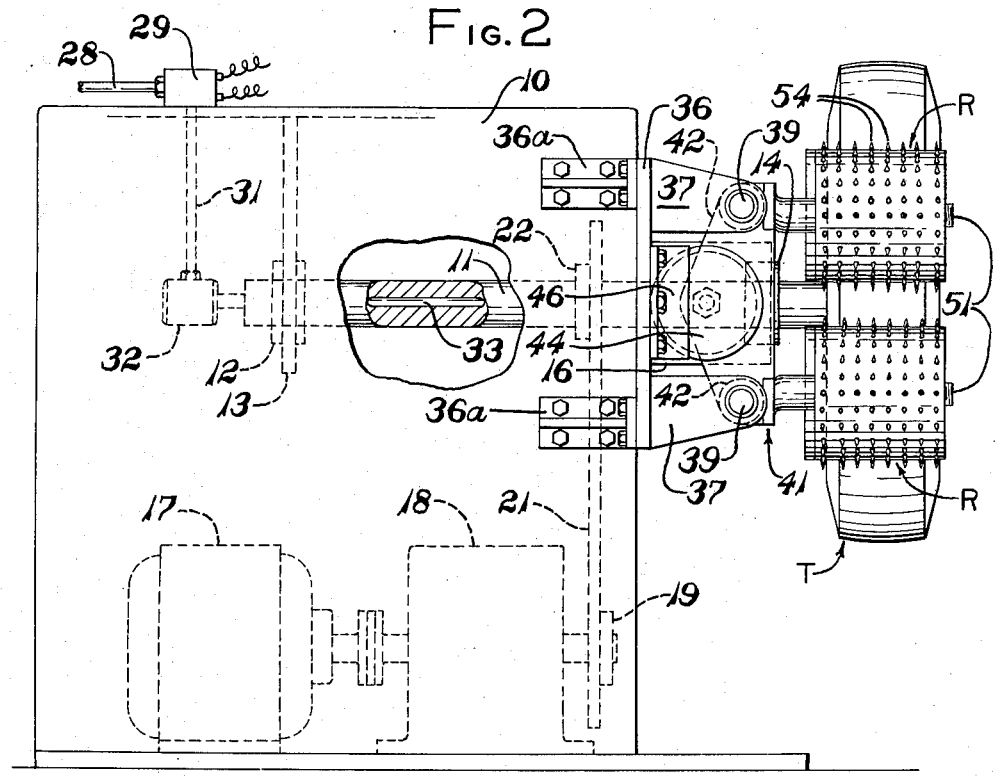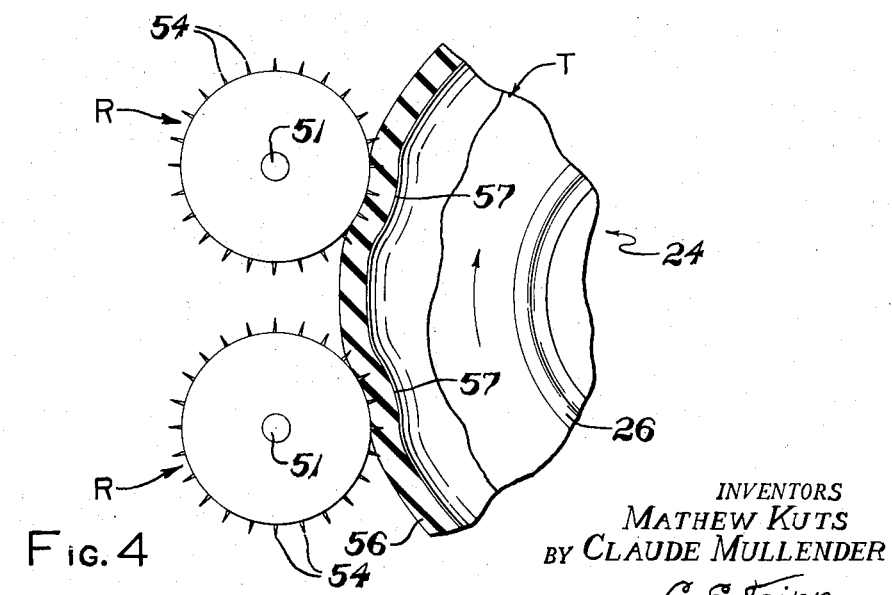

United States Patent Office 2,968,344
Patented Jan. 17, 1961

2,968,344

LACERATING TIRE TREADS FOR TRACTION

Mathew Kuts, Akron, and Claude Mullender, Barberton, Ohio, assignors to The B. F. Goodrich Company, New York, N.Y., a corporation of New York Filed Sept. 9, 1958, Ser. No. 759,978

4 Claims. (Cl. 157—13)

This invention relates to apparatus intended for lacerating tire treads to increase their traction on wet roads, slush and the like, as well as on dry roads. It has been proposed to treat tire treads for this purpose by lacerating them with a roller having a multitude of sharp teeth, pins or the like so that after treatment the tread has a large number of irregularly or randomly spaced punctures or lacerations which lacerations are formed without removal of rubber so that the lacerations are normally closed. A tire tread having this treatment gives improved traction under many conditions such as those referred to without materially reducing the life of the tread.

It is a feature of this invention that the lacerating operation can be performed very rapidly, that the apparatus is sturdy and self-balancing relative to the forces involved, and that the apparatus uniformly follows the periphery of the tire during the lacerating operation. Briefly, these advantages are obtained by providing a driven wheel and tire mounting rim, upon which a tubeless tire can be quickly mounted and inflated. A pair of diametrically opposed carriages are arranged at each side of the tire for motion toward the rotational axis of the rim. Each carriage carries a pair of circumferentially spaced lacerating rollers. A pneumatic cylinder presses each carriage toward the rotational axis so that the rollers ride on the tread of the tire. The rim is power driven, causing the teeth on the rollers to enter and lacerate the tread. These teeth on each roller are closely spaced and t..ey are arranged to avoid giving a regular pattern. The operation is not completed until the lacerations or punctures are distributed over the entire tread surface in close but irregular formation. Since the carriages are diametrically opposed the forces on the axle that carries the wheel and rim for the tire are balanced so that the machine is rugged and long lasting. In addition, since each carriage has a pair of circumferentially spaced rollers, the rollers cradle the tire and reduce the spring of the carriage mounting means in a direction normal to the motion of the carriages. Also, as mentioned, a satisfactory tread pattern can be made relatively rapidly which is particularly important where the operation is performed in a high production factory or shop. The manner in which these and other advantages may be obtained by one skilled in the art will be apparent from the following detailed description of a preferred embodiment of the invention.

In the drawings, Fig. 1 is a front elevation of the preferred apparatus of the invention. Fig. 2 is a side view thereof. Fig. 3 is a plan view and Fig. 4 is a diagrammatic sketch.

The apparatus includes a frame 10 which, as best seen in Fig. 2, mounts a shaft 11 carrying a wheel and rim for the tire. This shaft is mounted in an inboard bearing 12 suspended by a hanger 13 depending from the frame. There is an outboard bearing 14 fitted in a mounting tube 16 attached to the front or outer portion of the frame. In order to drive the shaft 11, a motor 17 is connected to a speed reducer 18 which turns a driving sprocket 19 over which passes a chain 21 that is trained around a driven sprocket 22 keyed to the shaft 11.

At the outboard end of shaft 11 is fixed a wheel mounting hub 23 to which is mounted in the usual manner a wheel and tire rim assembly 24. The tire rim 26 has low side flanges 27 for restraining the beads of a tubeless tire. These flanges are made lower than those on a standard rim to facilitate rapidly mounting and dismounting of the tire T.

In order to supply inflation air to the tire, as seen in Fig. 2, an air supply line 28 connects to a remote control valve 29 from which leads an air inlet line 31. This line connects to a rotary or swivel joint member 32 which directs air to a bore 33 extending the length of shaft 11. At the outboard end of the shaft a line 34 leads from a suitable connection to an air inlet passage formed in a wheel rim.

The wiring and relay portions of the control mechanism are not shown. This is because such mechanisms can be either automatically or manually operated in accordance with well-known machine design engineering, and these controls do not form part of the invention and are not claimed.

The carriage assembly is supported by a mounting plate 36 which is attached to the frame member 10 by means of brackets 36a, seen in Figs. 2 and 3. In order to support guide rails for the carriages, a pair of end brackets 37 is welded or otherwise attached to the mounting plate 36 at each end. As seen in Fig. 3, there are two central support brackets 38. Extending through apertures in these brackets is a pair of guide rails or rods 39 for slidingly mounting the carriages. The carriages are indicated generally by reference numeral 41 and are identical except that one is a right and the other is a left-hand assembly. In order to mount the carriages on the guide rails, they are provided with sleeve members 42 attached to a connecting plate 43, as is best seen in Fig. 1.

The carriages are moved toward and away from the wheel axis by individual air cylinders 44. Each cylinder has a rear mounting 46 seen in Fig. 1 and a forward mounting 47 seen in Figs. 1 and 3. The piston rod 48 of each cylinder connects to the connecting plate 43 so that both sleeves 42 respectively move together upon actuation of the cylinders. Each cylinder is a double acting one and the air and magnetic controls for these devices are so well-known that they form no part of the present invention.

Mounted on each carriage is a pair of circumferentially spaced, spiked, rollers R. Each spiked roller is mounted on a shaft 51 suitably fixed to its carriage by means of bearings 52, as best seen in Fig. 3. Each roller carries a toothed sleeve 53 (which may be formed in one or more segments) with sharp teeth 54 protruding outward from the sleeve metal to perform the tire tread lacerating operation.

In operation, the carriages are retracted and a tubeless tire is mounted on the wheel rim 26 by forcing the beads over low rim side flanges 27. Suitable controls then operate tire inflation valve 29 to supply inflation air to the tire and rim assembly. A gauge and pressure regulator is provided to automatically bring the tire to the best inflation pressure, which pressure will be in the nature of 40 p.s.i. for passenger car size tires. The motor 17 is then started and the tire is shown as rotating clockwise in Fig. 1 of the drawing by means of an arrow. The air supply to the air cylinders 44 is valved to urge the carriages toward the wheel axis bringing the spiked rollers against the tire tread. No positive stop is provided so that the rollers are resiliently pressed against the tire tread and follow its contour regardless of the exact geometrical disposition thereof. Since the carriages are diametrically opposed the force that they exert on the tire wheel and shaft assembly is balanced, so that the shaft is not deflected by the strain and is not deflected against the bearings. The life of the machine is thus prolonged. We have found that a suitably prepared tire can be produced with this apparatus in about 30 seconds of operation time.

Referring to Fig. 4, which is a diagrammatic sketch, it can be seen how the rollers 41 press against the tread 56 of the tire causing it to dimple slightly as at 57.

Since no unbalanced forces are involved, there is no tendency of the tire tread, as it is engaged by the rollers, to spring the carriage mounting means downwardly on one side and upwardly on the other side With a single roller this spring would cause the lacerating roller to move away from the periphery of the tire, but with the cradle arrangement of the rollers like that of this invention (referring to the right-hand carriage of Fig. 1, for example) any springing that may exist brings the upper roller closer to the tire apex and increases the resistance to such springing so that a self-balancing action is obtained.

Although we attempt to arrange the teeth on the rollers so that there will be no regular pattern formed but rather a random pattern, to insure that a random pattern will be produced, we offset the radially transverse midplanes of the two pairs of rollers by a small distance "d" seen at the right of Fig. 3.

Thus, it can be seen that the apparatus of our invention relieves strains on the machine both on the tire mounting shaft and on the carriage mounting rails and the tire will be rapidly treated, which is of importance in both production and in major service station operation.

In Fig. 3 the tire is shown at the left side of the drawing in section at a location where the tire is not flattened. At the right-hand side of the figure the tire is shown in section at a location where it is engaged by a roller and it will be seen that the tire tread is flattened by the roller during operation. This flattening is desirable because the tire is flattened by engagement with the road when used on a vehicle.

The embodiments of the invention in which an exclusive property or privilege is claimed are defined as follows:

1. Apparatus for treating the tread of a tire to improve its traction comprising a frame, a shaft rotatably mounted in said frame and projecting therefrom, a wheel and tire mounting rim mounted on said shaft projection, means to rotate said shaft, a pair of diametrically opposed carriages, means for mounting said carriages for motion toward the axis of said shaft along a substantially straight line passing through and perpendicular to said axis, a pair of circumferentially spaced spiked tire tread lacerating rollers on each carriage, said rollers being symmetrically disposed on opposite sides of their line of motion with their axes parallel to the axis of said shaft, and means to simultaneously advance said carriages toward said shaft axis to press said rollers with equal pressure against the tread of a tire mounted on said rim.

2. Apparatus for treating the tread of tire to improve its traction comprising a frame, a shaft rotatably mounted in said frame and projecting therefrom, a wheel and tire mounting rim mounted on said shaft projection, means to rotate said shaft, a pair of diametrically opposed carriages, means for mounting said carriages for motion toward the axis of said shaft along a substantially straight line passing through and perpendicular to said axis, a pair of circumferentially spaced spiked tire tread lacerating rollers on each carriage, said rollers being symmetrically disposed on opposite sides of their line of motion, and pneumatic cylinder means to advance said carriages toward said axis and yieldingly press said rollers against the tread of a tire mounted on said rim with the said inward motion of said carriages limited only by contact of the rollers with a tire mounted on said rim.

3. Apparatus for treating the tread of a tire to improve its traction comprising a frame, a shaft rotatably mounted in said frame and projecting therefrom, a wheel and tire mounting rim mounted on said shaft projection, a pair of diametrically opposed carriages, means mounting said carriages for motion toward the axis of said shaft along a substantially straight line passing through and perpendicular to said axis, a pair of circumferentially spaced spiked tire tread lacerating rollers on each carriage, said rollers being symmetrically disposed on opposite sides of their line of motion with their axes parallel to the axis of said shaft, and fluid pressure means to simultaneously advance said carriages toward said axis to press each pair of said rollers with equal pressure against the tread of a tire mounted on said rim thereby preventing unbalanced forces in the apparatus.

4. Apparatus as defined in claim 3, including means coaxial with said rotatable shaft to inflate said tire after mounting thereof on said rim.

References Cited in the file of this patent

UNITED STATES PATENTS

| 1,956,331 | Mullin | Apr. 24, 1934 |
|---|---|---|
| 2,524,489 | Strong | Oct. 3, 1950 |
| 2,623,591 | Furnald | Dec. 30, 1952 |
| 2,707,851 | Strong | May 10, 1955 |
| 2,734,568 | Anderson | Feb. 14, 1956 |
| 2,762,431 | Kuts | Sept. 11, 1956 |